United States Patent [19]

Takai

[11] 4,452,409
[45] Jun. 5, 1984

[54] BRAKING SYSTEM FOR A TAPE PLAYER

[75] Inventor: Kazuki Takai, Tokyo, Japan

[73] Assignee: Clarion Co., Ltd., Tokyo, Japan

[21] Appl. No.: 388,331

[22] Filed: Jun. 14, 1982

[30] Foreign Application Priority Data

Jun. 15, 1981 [JP] Japan .............................. 56-87663[U]
Jun. 15, 1981 [JP] Japan .............................. 56-87671[U]
Jun. 15, 1981 [JP] Japan .............................. 56-87674[U]

[51] Int. Cl.³ ........................ G03B 1/04; G11B 15/32
[52] U.S. Cl. .................................... 242/204; 360/74.1
[58] Field of Search ...................... 242/198, 200–204; 360/74.1, 74.2, 74.3

[56] References Cited

U.S. PATENT DOCUMENTS 2,783,951 3/1957 Munroe .............................. 242/204
3,085,759 4/1963 Guest .............................. 242/204 X Primary Examiner—Leonard D. Christian
Attorney, Agent, or Firm—Flynn, Thiel, Boutell & Tanis

[57] ABSTRACT

In a braking system adopted in a tape player, an intermittently rotating cam has provided thereon a brake tripping portion and brake releasing portion with which a roller on a power plate is in such a contact as to be driven by the cam. The power plate may be reciprocally moved as the cam gear is rotated, thus providing for a brake control mechanism; coupled to the power plate of this brake control mechanism are a braking mechanism and also a head shift mechanism.

7 Claims, 14 Drawing Figures

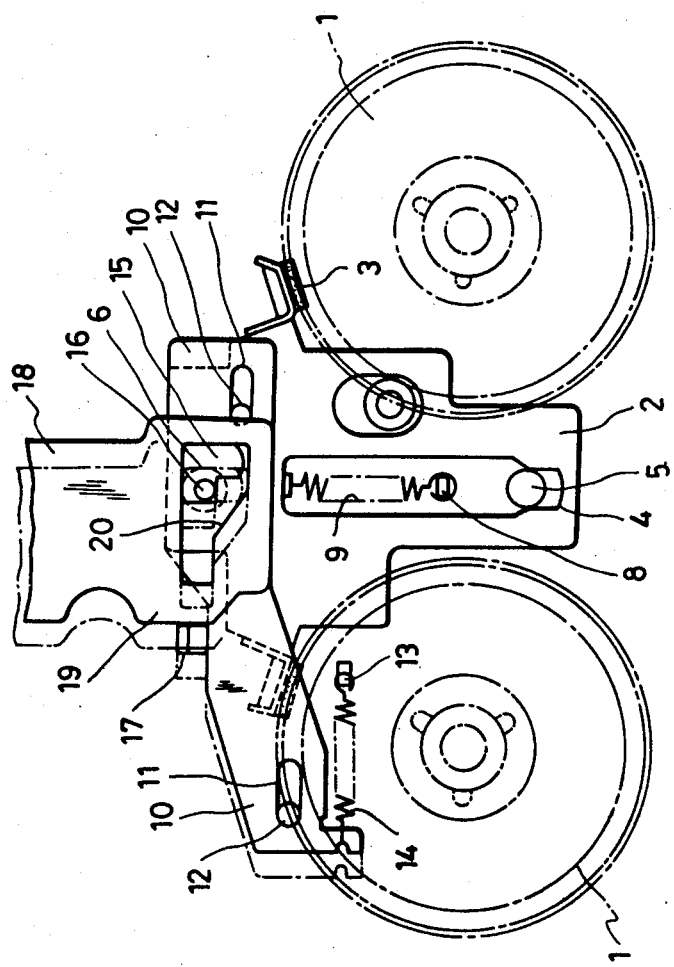
FIG. I (A)

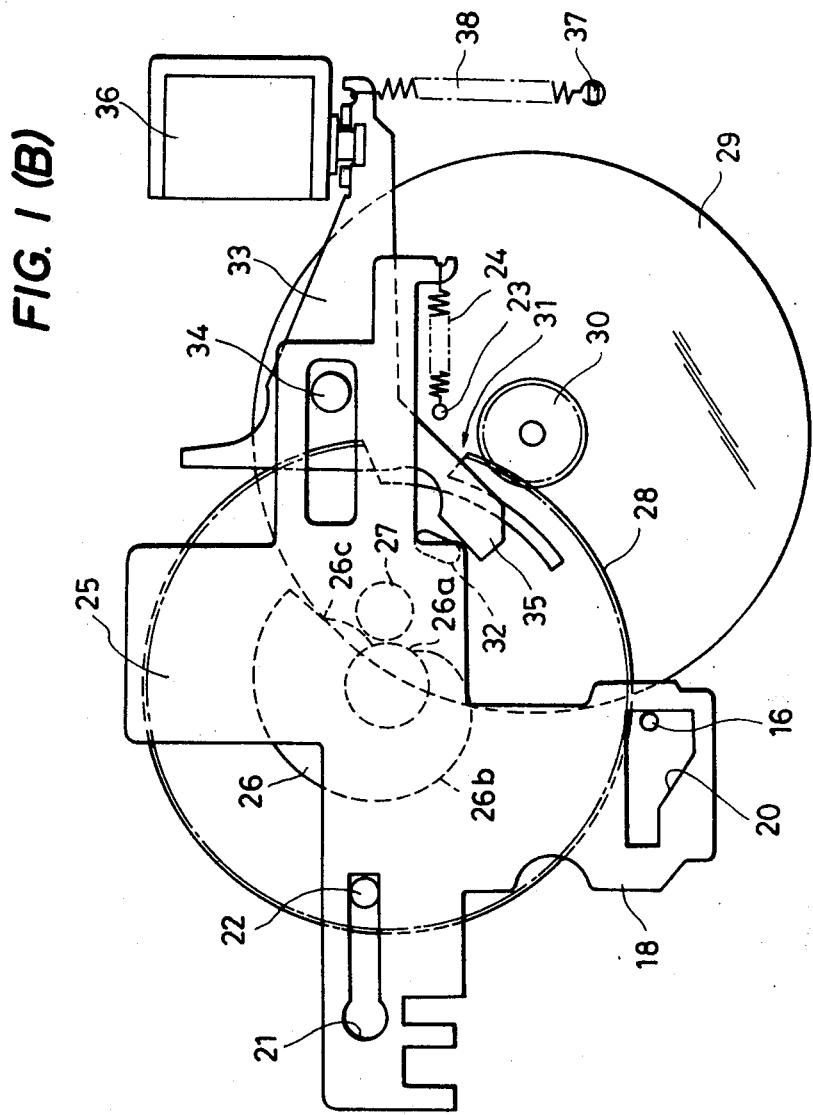
FIG. I (B)

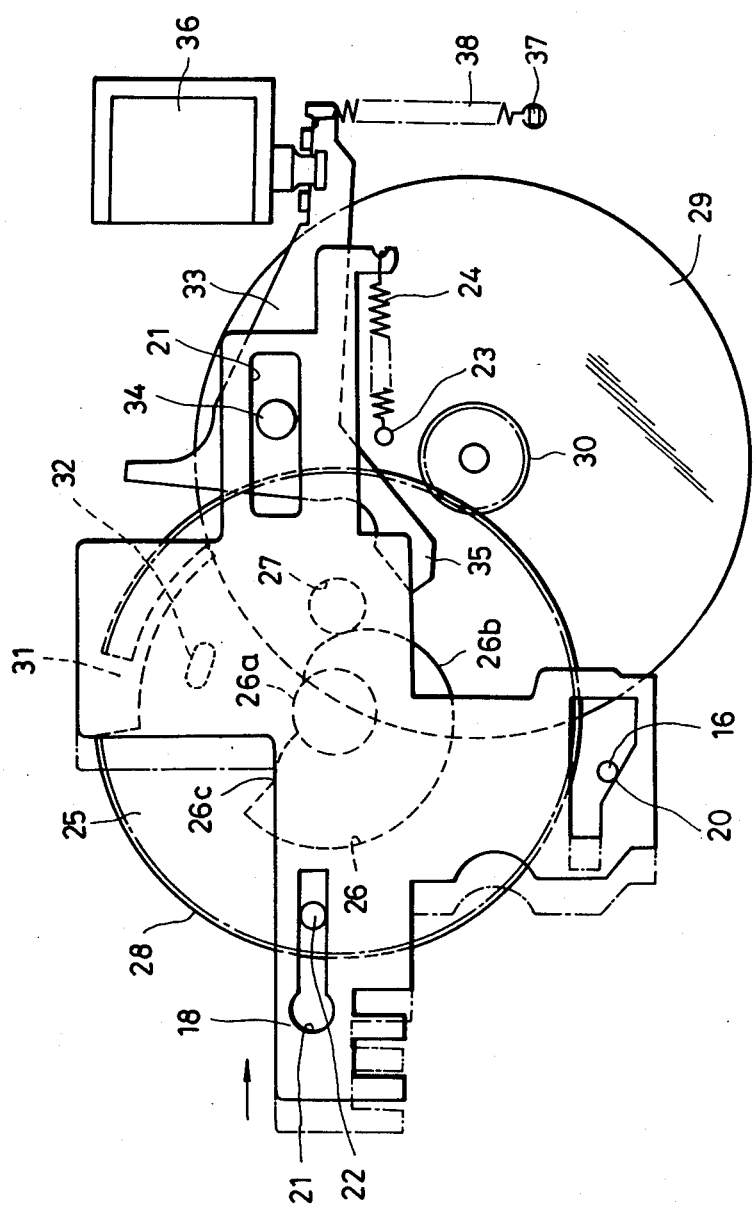

BRAKING SYSTEM FOR A TAPE PLAYER

BACKGROUND OF THE INVENTION

1. Field of the Invention

The present invention relates to a braking system for a tape player and it relates especially to a braking system for preventing a tape reel from overrunning when stopping the fast forward or rewinding travel of a tape.

2. Description of the Prior Art

In the recent tape players, there is employed an automatic music selection mechanism which automatically selects a desired one of many music selections recorded on a tape. The automatic music selection mechanism is such that, after setting the tape player for the fast forward or rewinding travel of the tape, it detects on the tape traveling at high speed a zone between two successive music selections where no sound is recorded, the existence of such a soundless zone causing the tape player to return to the normal state of reproduction.

In case such an automatic music selection mechanism is employed, if the tape is not immediately shifted to the low speed travel when the tape is shifted from the fast forward or rewinding travel at the high speed, the beginning of a selected or detected music selection will overrun the head and thus not be reproduced. To avoid this, the solution has been taken by which the pinch rollers are kept off the capstan against the force of a spring during the fast forward or rewinding travel of tape and, when the beginning of a music selection is detected and the tape is shifted to the normal travel, the spring force is utilized to instantaneously force the pinch rollers to the capstan, thus reducing the speed of tape travel. In such a conventional arrangement, however, when the tape is shifted to the fast forward or rewinding travel, it is necessary to move the pinch rollers from the capstan against the spring force, which leads to the necessity of an extremely great force for operation of the pinch roller shifting mechanism, such as a solenoid, switching lever, etc.

Recently, a tape player has been proposed in which to reduce the operating force necessary for shifting the tape to the fast forward or rewinding travel, the driving force of the motor is utilized to force the pinch rollers, etc. from the capstan, or to shift the head to and from the tape. In such a case the driving force of the motor is utilized, however, the time required for the pinch rollers to return from the off position to the on position is rather long as compared with the conventional spring-operated mechanism. Accordingly, when the operation for music selection is intended, if the reel base is stopped against rotation by any means after shifting the tape from the fast forward or rewinding travel, the pinch rollers will be forced onto the capstan so that the inertia yielded by the high-speed rotation for the fast forward or rewinding travel will cause the aforementioned soundless zone between two successive musics recorded on the tape to overrun the reproduction head while the tape is returned to the low-speed travel, thus creating the likelihood that a selected or desired music cannot be reproduced from its beginning.

SUMMARY OF THE INVENTION

Accordingly, the present invention is provided to overcome the aforementioned drawbacks of the conventional technology, and it has the object to provide a braking system which can be adopted, even in a tape player in which the driving force of the motor is utilized to set the pinch rollers in the on or off position with respect to the capstan, to immediately slow down the tape when shifting it from the fast forward or rewinding travel at the high speed to the normal state of reproduction.

The braking system according to the present invention is composed of a braking mechanism, cam mechanism for controlling the braking mechanism, and head shift mechanism actuated by the cam mechanism.

In order that the present invention may be clearly understood and readily carried into effect, one embodiment thereof will now be described, by way of example only, with reference to the accompanying drawings.

BRIEF DESCRIPTION OF THE DRAWINGS

The drawings are plan views illustrating the braking system of a tape player embodied in accordance with the present invention, of which:

FIG. 1(A) is a diagrammatic top view which shows the braking mechanism according to the present invention, with the solid line indicating the braking mechanism in the brake released position while the single dot and dash line indicates it in the braking position;

FIG. 1(B) is a diagrammatic top view which shows the brake control mechanism in the braking position;

FIGS. 3(A) and 3(B) are diagrammatic top views which show the brake control mechanism in between the brake-releasing position and braking position;

FIG. 5 showing the mechanism in the stopped position, FIG. 6 showing it in the head-forwarding starting position, FIG. 7 showing it in the course of forwarding the head, FIG. 8 showing it in the completion of head forwarding, FIG. 9 showing it in the course of holding the head for reproduction, and FIG. 10 showing it in the tape fast-forwarding and/or rewinding position.

DETAILED DESCRIPTION OF THE PREFERRED EMBODIMENTS

Figure 2A:
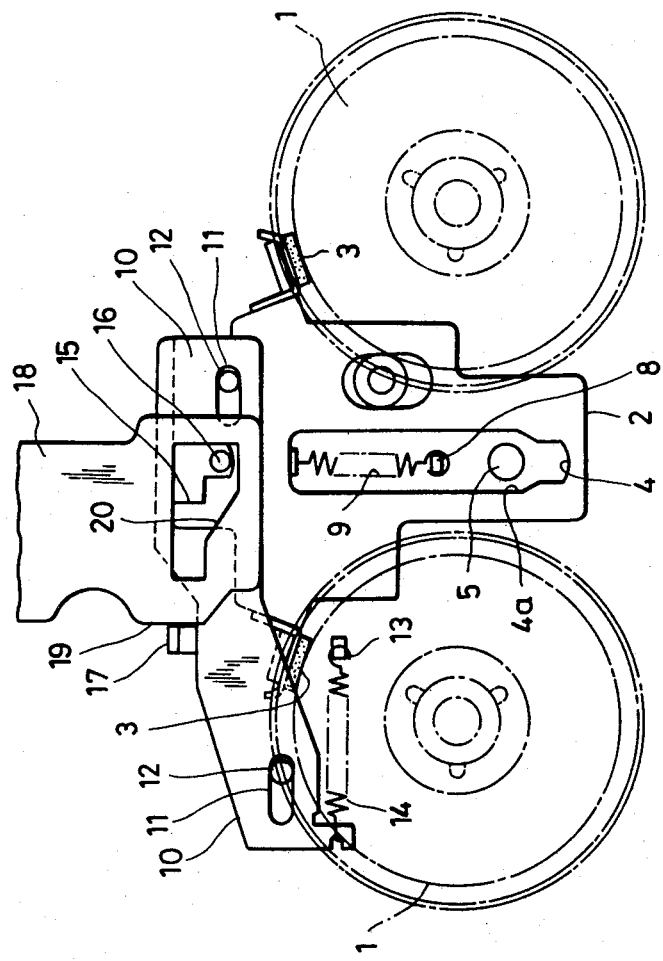
FIGS. 2(A) and 2(B) are diagrammatic top views which show the brake control mechanism in the braking position.

Each of the component mechanisms of the braking system according to the present invention will be described below.

(A) Braking mechanism:

Referring to the Figures, there is disposed between right and left reel bases 1 a brake plate 2 arranged so as to be perpendicular to the line connecting the centers of these reel bases 1. The brake plate 2 has provided thereon a pair of brake shoes 3 opposite to the outer circumferences of said reel bases 1. There is provided in the center of the brake plate 1 a guide hole 4 extending perpendicular to the line connecting the centers of the reel bases 1 and in which there is slidably fitted a guide pin 5 provided on the base plate side of the tape player. The guide hole 4 has at the lower end thereof a width nearly equivalent to the profile of the guide pin 5, while it is wider at the upper end thereof than the profile of the guide pin 5. Further, the brake plate 2 has provided at the upper end thereof another guide pin 6 which is slidably fitted in a guide hole 7 (FIG. 4A) opened in the longitudinal direction in the base plate of the tape player. There is extended between the brake plate 2 and an engaging claw 8 provided projecting from the base plate of the tape player a spring 9 which serves to always force the brake plate 2 toward the reel bases 1.

The brake plate 2 has the top end thereof provided near a lock plate 10 which is movable in the direction perpendicular to the brake plate, namely, in the direction parallel to the line connecting the centers of the reel bases 1. The lock plate 10 has formed therein two guide holes 11 extending in the moving direction of the lock plate and in which there are slidably inserted, respectively, guide pins 12 provided on the base plate of the tape player. Further, there is extended between the lock plate 10 and an engaging claw 13 provided on the tape player base plate a spring 14 which serves to always force the lock plate 10 rightward in the plane of the Figures. The lock plate 10 has provided in the center thereof an L-shaped lock opening 15 in which is inserted a brake control pin 16 provided on the brake plate 12. Furthermore, there is provided at the upper portion of the lock plate 10 a releasing projection 17 extending upward which is engageable with a power or powering plate 18 which will be further described below.

The power plate 18 is disposed above the lock plate 10 and is movable in the same direction as the lock plate 10 (in the direction parallel with the line connecting the centers of the reel bases 1) as forced by the cam mechanism for control of the braking mechanism. The power plate 18 has provided thereon a pushing portion 19 which is in contact with the releasing projection 17 provided on the lock plate 10, and it has further formed in the center thereof a taper cam 20 inclined from the upper end of the brake plate 2 toward the bottom end thereof and with which is slidably engaged the upper end of the brake control pin 16 provided on the brake plate 2.

(B) Brake control cam mechanism:

The aforementioned power plate 18 is guided by a plurality of guide holes 21 formed therein and a plurality of guide pins 22 provided projecting from the tape player base plate, thus the power plate 18 is movable laterally, namely, in the direction parallel to the line connecting the centers of the reel bases 1. There is provided extending between the power plate 18 and a pin on the tape player base plate a spring 24 by which the power plate 18 is attracted and forced rightward in the plane of the Figures. There is rotatably mounted below the power plate 18 a cam gear 25 on the upper surface of which, or on the surface opposite to the power plate 18, there is integrally provided a cam 26 having a nearly spiral profile. On the surface of the power plate 18 opposite to the cam gear 25 is a roller 27 which is rotable in contact with the outer circumference of the cam 26.

The cam gear 25 has formed along the outer circumference thereof teeth 28 for driving the cam gear 25; these teeth 28 mesh with a pinion 30 provided in the center of one of the flywheels 29 of the tape player. That is, the flywheel 29 is disposed below the cam gear 25, and the pinion provided on the upper face of the flywheel 29 is in mesh with the gear 28 on the cam gear 25. There is formed in the gear 28 on the cam gear 25 a cut 31 along which the gear 28 is disengaged from the pinion 30 on the flywheel 29, thus transmitting no turning force. It should be noted here that the flywheel 29 is connected with a tape-travel drive motor by means of a belt and is thus rotated by the turning force of the motor.

The aforementioned cam 26 consists of a brake actuating portion 26a nearest the center of the cam 26, a brake releasing portion 26b continuing the portion 26a and spirally extending outward from the center of the cam 26, and a inclined portion 26c connecting the end of the brake releasing portion 26b and the brake actuating portion 26a in the center of the cam 26.

There is provided projecting in the front of the cam gear 25 a stopper 32 corresponding to the cut 31. The power plate 18 is provided above a plunger link 33 with an end projecting near the stopper 32 of the cam gear 25, and which is pivotably mounted on a support shaft 34 provided on the tape player base plate and is terminated at one end thereof by a portion 35 which engages with the stopper 32 while the other end opposite to the engaging portion 35 engages with a plunger or solenoid 36. There is provided extending between the plunger link 33 and a projection 37 provided on the base plate of the tape player a spring 38 which makes the plunger link 33 pivot in the direction opposite to the attracting direction of the solenoid 36 so that the engaging portion 35 at the one end of the plunger link 33 is made to project on the center side of the cam gear 25 and to engage with the stopper 32 on the cam gear 25.

Figure 5:
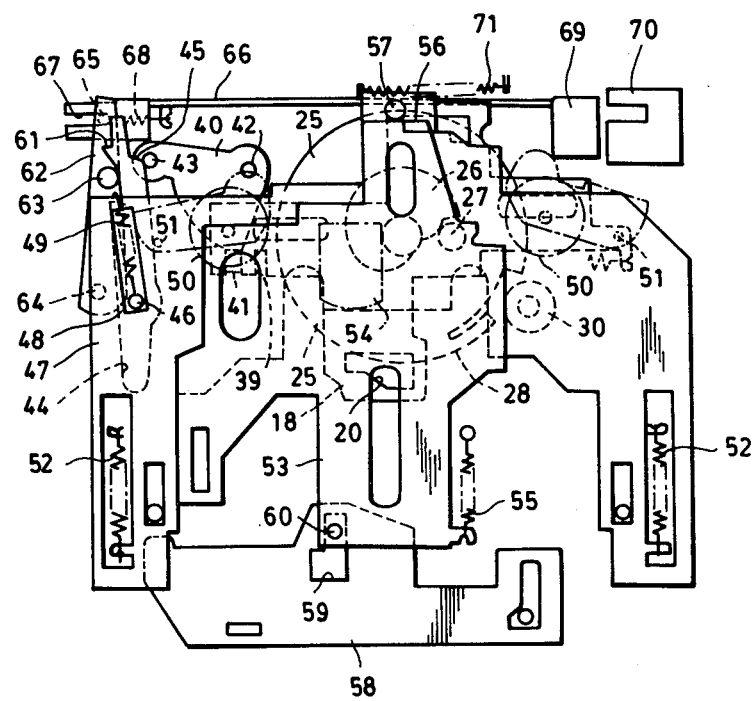
FIGS. 5 to 10 are diagrammatic top views which show one example of the head shift mechanism in the braking system according to the present invention.

(C) Head shift mechanism:

The head shift mechanism is composed as shown in FIG. 5 and subsequent Figures. It comprises the power plate 18 driven by the aforementioned cam mechanism and its associated members.

More particularly, the power plate 18 has formed at the end opposite to the plunger 36 an engaging portion 39 shaped like a cut and in which is engaged a claw 41 of a power link 40 provided adjacent to the power plate 18. The power link 40 is pivotably mounted on a support shaft 42 provided on the tape player base plate, and it has provided at the end thereof opposite to the claw 41 of the power link 40 a pushing pin 43 which engages with a head link 44 supported for movement in the direction perpendicular to the power plate 18. The head link 44 is mounted pivotably to and fro with respect to the tape player base plate, and it has at the end thereof a stepped portion 45 with which the pushing pin 43 engages.

The head link 44 had provided nearly in the center thereof a shaft 46 coupled with a pinch roller plate 47 which is disposed on the front side of the tape player base plate. The pinch roller plate 47 has provided therein a shaft hole 48 in which the shaft 46 of the head link 44 is inserted. There is provided between the shaft 46 and pinch roller plate 47 a spring 49 which serves to retain the shaft so as not to inadvertently wobble within the shaft hole 48. The pinch roller plate 47 has mounted thereon support shafts 51 which rotatably support right and left pinch rollers for forward and reverse travels of tape, respectively. Accordingly, the right and left pinch rollers 50 move to and fro on the tape player base plate as the pinch roller plate 47 is moved to and fro. There is provided between the pinch roller plate 47 and the base plate of the tape player a pair of springs 52 by which the pinch roller plate 47 is always urged in the direction of the rear side of the tape player, namely, in the direction opposite to the reel bases 1.

The pinch roller plate 47 is provided below a head plate 53 which is mounted movably to and fro with respect to the tape player base plate. The head plate 53 had fixed in the center thereof a head 54. There is provided between the head plate 53 and tape player base plate a spring 55 by which the head plate 53 is urged in the direction of the rear side of the tape player (namely, in the direction opposite to the reel bases 1) like the aforementioned pinch roller plate 47. The head plate 53 has a trailing edge 56 with which a pushing shaft 57 provided on the pinch roller plate 47 is in possible contact.

There is provided in front of the head plate 53 a head lock plate 58 movable in the direction perpendicular to the head plate and which has provided thereon an L-shaped engaging opening 59 in which an engaging pin 60 provided on the head plate 53 is inserted.

The head link 44 has formed at the edge opposite to the stepped portion 45 an engaging projection 61 with which a lock pin 63 of a lock pin 62 provided adjacent to the head link 44 engages. The lock arm 62 is mounted oscillatably about a support shaft 64 provided at the end thereof with respect to the tape player base plate; there is provided a coupling pin 65 projecting from the upper end of the lock arm 62 (on the rear side of the tape player). The lock arm 62 further has provided at the end thereof a plunger plate 66 extending in the direction perpendicular to the lock arm, or in the direction of the tape player width and which has provided at one end thereof a guide recess 67 in which the coupling pin 65 of the lock arm 62 is slidably fitted. There is provided between the coupling pin 65 and the plunger plate 66 a spring 68 by which the coupling pin 65 is always urged to the inner end of the guide recess 67, namely, toward the center of the plunger plate 66.

On the other hand, the plunger plate 66 has fixed at the other end thereof a core 69 to which a holding plunger or solenoid 70 is provided opposite. There is provided between the plunger plate 66 and tape player base plate a spring 71 by which the plunger plate 66 is urged toward the holding plunger 70. Namely, during the operation of the tape player, the plunger plate 66 is held in the left position in the plane of the Figures (in the position thereof urged by the spring 71) as attracted by the holding plunger plate 70, and when the attraction of the holding plunger plate 70 is eliminated, the plunger plate is movable to the left side in the plane of the Figures against the force of the spring 71.

The braking system according to the present invention functions as will be described below; for the simplicity of explanation, the braking and head shift mechanisms will be separately explained concerning their functions.

(A) Braking mechanism:

(1) Brake released position:

When the tape player is in the normal state of reproduction or in the fast forwarding state, the brake plate 2 must be locked by the brake control mechanism so that the brake shoe is off the outer circumference of the reel base 1.

Figure 4:
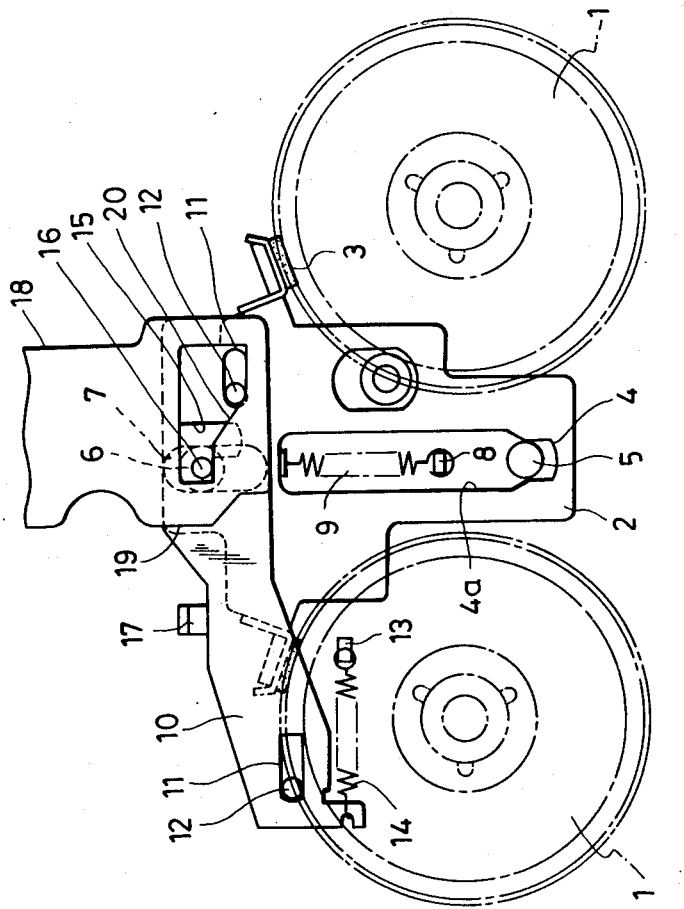
FIGS. 4(A) and 4(B) are diagrammatic top views which show the braking system in the brake released and locked position.
Figure 4B:
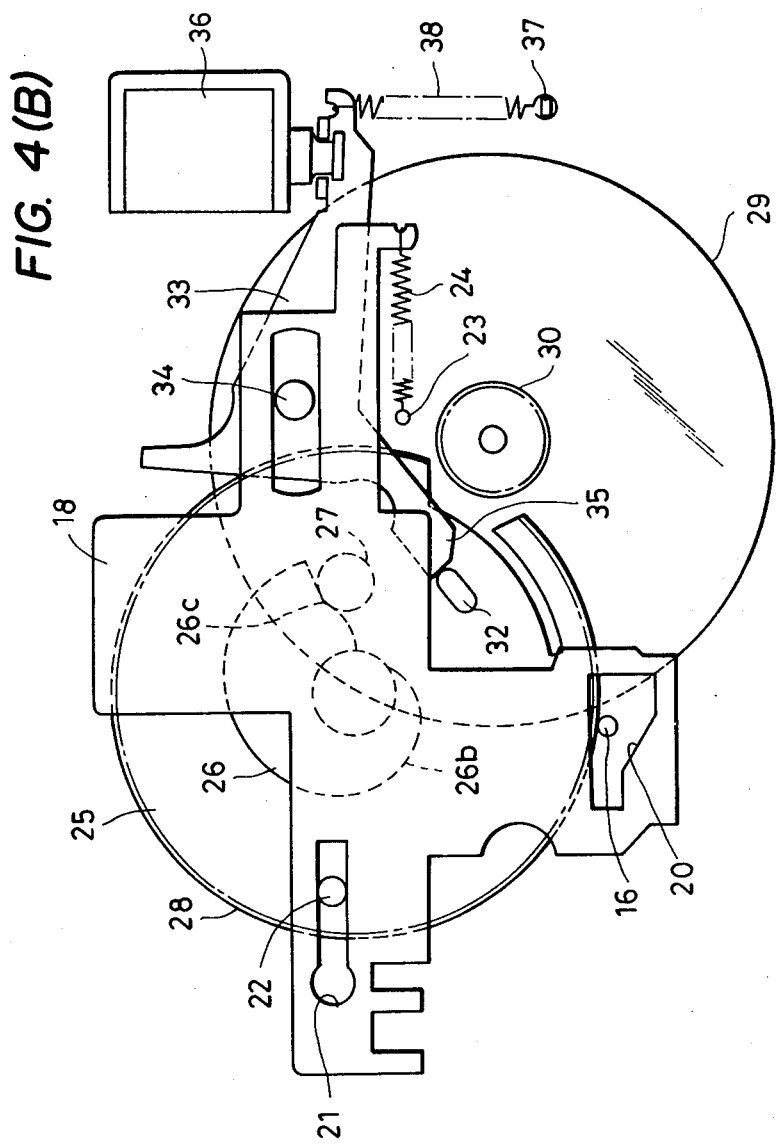

Namely, as shown in FIG. 4(B), the cut 31 formed in the outer circumference of the cam gear 25 is aligned with the pinion 30 on the flywheel 29, thus no turning force will be transmitted from the flywheel 29 to the cam gear 25. At the same time, the engaging portion 35 at the end of the plunger link 33 abuts the stopper 32 provided on the cam gear 25 so that the cam gear 25 is stopped in a position defined by the plunger link 33. In this case, the roller 27 on the power plate 18 is forced to and in contact with the cam 26 provided on the cam gear 25 by means of the spring 24, and the above-mentioned contact position corresponds to the position of the inclined portion 26c of the cam 26.

On the other hand, in the braking mechanism, the brake plate 2 has been pulled upwardly to a retracted position against the force of the spring 9 as shown in FIG. 1, and the brake control pin 16 provided on the brake plate 2 engages with the edge or shoulder of the horizontal section of the L-shaped locking portion 15 of the lock plate 10. The pushing portion 19 of the power plate 18 and the releasing projection 17 of the lock plate 10 are set in the respective positions off each other. Therefore, in this state, the brake plate 2 is urged by the spring 9 but cannot be shifted to the reel bases 1.

(2) Braking position:

By pressing the reproduction or play switch for returning the tape player from the fast forward or rewinding state to the normal state of reproduction, the plunger 36 is energized according to the signal issued by pressing the reproduction switch and attracts the end of the plunger link 33 against the force of the spring 38. Then, the engaging portion 35 provided at the upper end of the plunger link 33 is disengaged from the stopper 32 so that the cam gear 25 becomes freely rotatable. As the result, the roller 27 in contact with the inclined portion 26c of the cam 26 attains the position occupied by the brake actuating portion 26a which is nearest the center of the cam 26. In this case, since the power plate 18 on which the roller is mounted is urged to the right side in the plane of Figures by the spring 24, the roller 27 presses the cam 26 while moving along the inclined portion 26c of the cam 26 so that the cam gear 25 is forced to rotate through a predetermined angle due to the pressure applied to the cam 26.

Thus, as the power plate 18 is moved to the left side in the plane of Figures, the releasing projection 17 is engaged by the pushing portion 19 provided on the power plate 18, and the lock plate 10 integral with the releasing projection 17 is moved to the left to a release position. Then, the brake control pin 16 is disengaged from the horizontal section of the L-shaped lock 15 of the lock plate 10 so that the brake plate 2 is instantaneously moved to the reel bases 1 as urged by the spring 9. In this case, since the power plate 18 remains moved to the left side in the plane of Figures, the lowest portion of the taper cam 20 (portion on the side of the reel bases 1) is in the position of the brake control pin 16. Accordingly, the brake control pin 16 and the brake plate 2 on which the brake control pin is provided can be moved freely without interference by the taper cam 20.

(3) Braking position:

As mentioned in the foregoing, as the brake plate 2 is instantaneously moved to a braking position by the spring 9, each brake shoe 3 provided on the brake plate 2 is forced onto the outer circumference of a reel base 1 as shown in FIG. 2(A); as the result, the reel bases 1 will be braked. In this case, since the guide hole 4 provided in the brake plate 2 has at the upper end thereof a width 4a greater than the profile of the guide pin 6, the brake plate 2 becomes pivotable laterally about the guide pin 6 at the bottom end. Thus, the brake plate 2 is so strongly forced as to bite in the takeup reel base, thus stopping the reel base 1 from being continuously driven at a high speed under the effect of the inertia produced by the fast forward or rewinding operation.

Figure 2B:
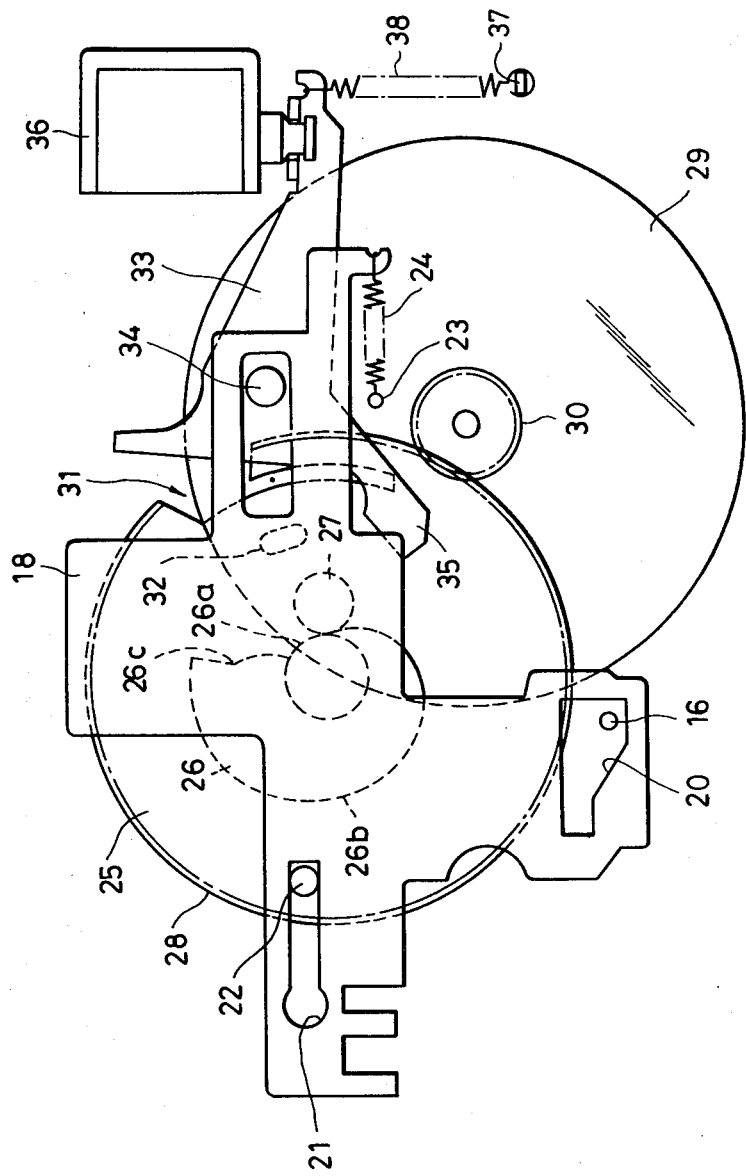

In this case, as the cam 26 is pressured by the roller 27 so that the cam gear 25 is rotated through a predetermined angle, the cut 31 in the cam gear 25 passes by the pinion 30 so that the pinion and the gear teeth 28 of the cam gear 25 in turn will be in mesh, as seen in FIG. 1(B). Then the rotation of the flywheel 29 driven by the motor is transmitted via the pinion 30 to the cam gear 25 which in turn will start rotating. In this way, also the cam rotates but since the brake actuating portion 26a on the cam 26 has a certain width, the position of the power plate 18 being in contact with the brake actuating portion 26a by means of the roller will not be changed even when the cam 26 rotates from the position in FIG. 1(B) to that in FIG. 2(B). Thus, the above-mentioned urging of the brake plate 2 to the reel base 1 is maintained.

(4) Released position:

The brake is actuated in the first moment when the tape player is shifted from the fast forward or rewinding state to the normal state of reproduction. However, since the shift to the state of reproduction of the other members of the tape player, such as pinch rollers, head, etc. is done with the driving force of the motor, it will take a certain operating time as compared with the braking time. To solve this problem, according to the present invention, the above-mentioned operating time is utilized to render the brake to the initial locked state while the pinch rollers and head are completely shifted to the normal state of reproduction, and to then release the brake to start the state of reproduction.

Figure 3A:
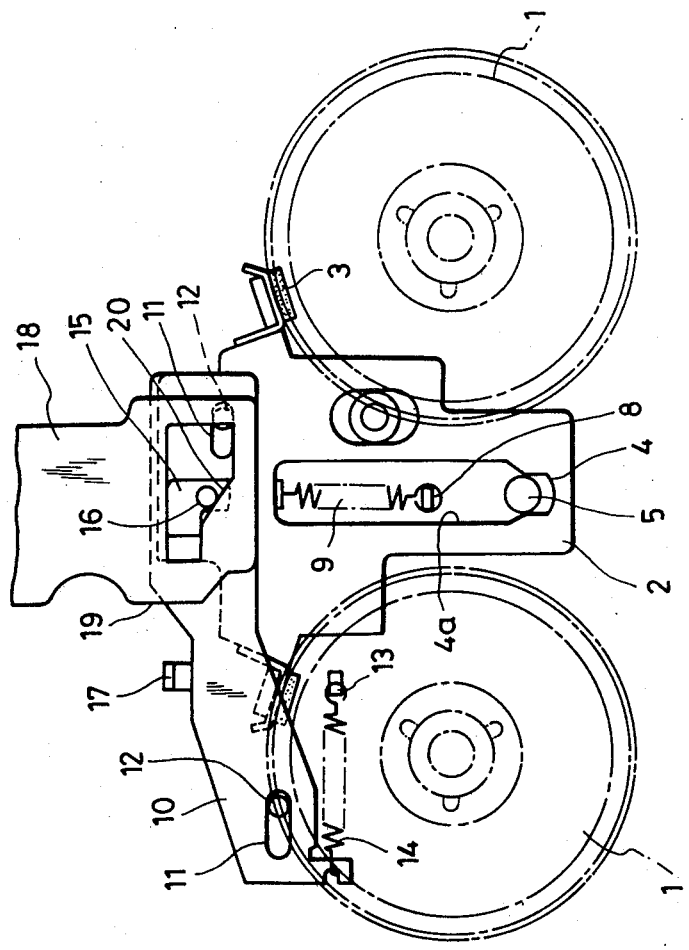

More particularly, when the cam gear 25 keeps rotating, the roller 26 will get in contact with the brake releasing portion 26b, as shown in FIG. 3(B), and be moved by the brake releasing portion 26b so that the roller 27 and the power plate 18 on which the roller is mounted are moved to the right in the plane of Figures against the force of the spring 24. Along with the movement of the power plate 18, the brake control pin 16 engaging with the taper cam 20 rises along the inclined surface of the taper cam as shown in FIG. 3(A) and FIG. 4(A) so that the brake plate 2 is moved by the brake control pin 16 to its retracted position against the force of the spring 9. As the result, the engagement of the brake plate 2 and the reel base 1 is eliminated so that the reel bases are freed as in the initial state and are rotatable at the normal speed of reproduction.

When the brake plate 2 is returned to the initial position in this way, the brake control pin 16 engages with the horizontal section of the L-shaped lock 15 of the lock plate 10 attracted by the spring 14. Then, as the brake plate 2 is connected to the end of the brake control pin 16, the latter and the brake plate 2 on which the pin 16 is provided are engaged in the initial locked position as shown with the solid line in FIG. 1. The power plate 18 is moved to the right in the plane of Figures as the roller 27 is moved by the brake releasing portion 26b, but is is stopped in the condition as shown in FIG. 4(B) because after the roller 27 attains nearly the center of the inclined portion 26c beyond the brake releasing portion 26b, the can gear 25 is inhibited by the stopper 32 from rotating.

(B) Head shift mechanism:

When the power plate 18 is laterally moved by the cam gear 25 rotated as mentioned above, the head shift mechanism will function as follows.

(1) When tape player is stopped:

While no cassette is inserted in the tape player or when the tape player is not operated, the pinch roller plate 47 and the head plate 53 are moved under the action of the springs 52 and 55 provided on them, respectively, back to positions away from the tape path.

At this time, the cam gear 25 is stopped because the engaging portion 35 provided on the upper end of the plunger link 33 abuts the stopper 32.

Figure 6:
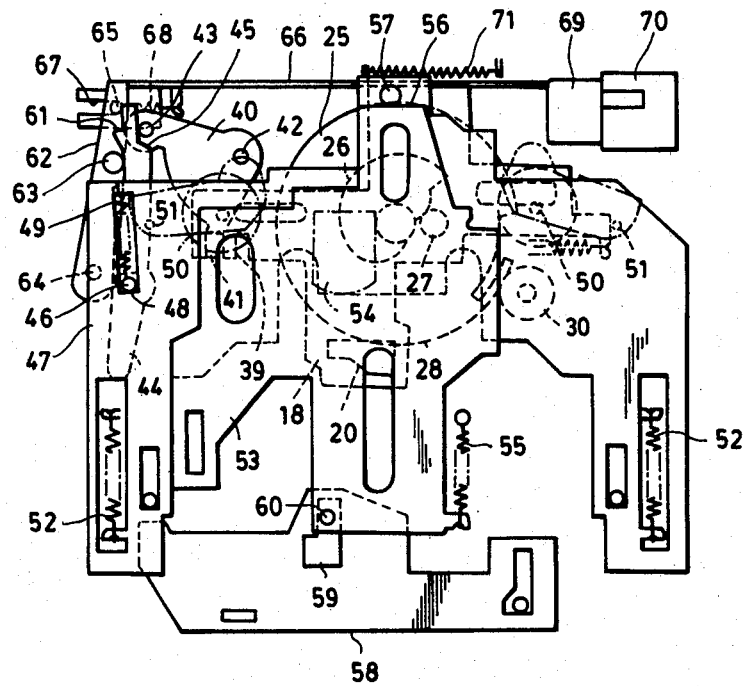
Figure 7:
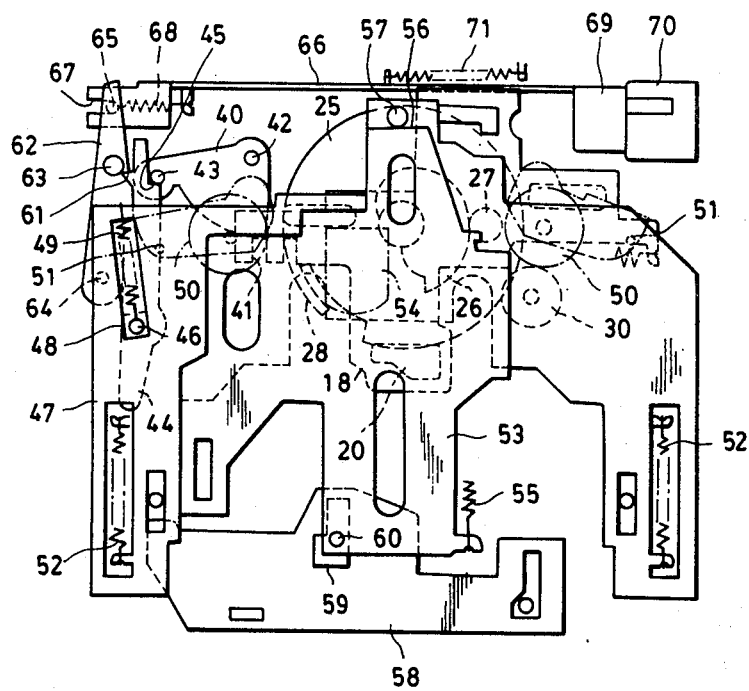
Figure 8:
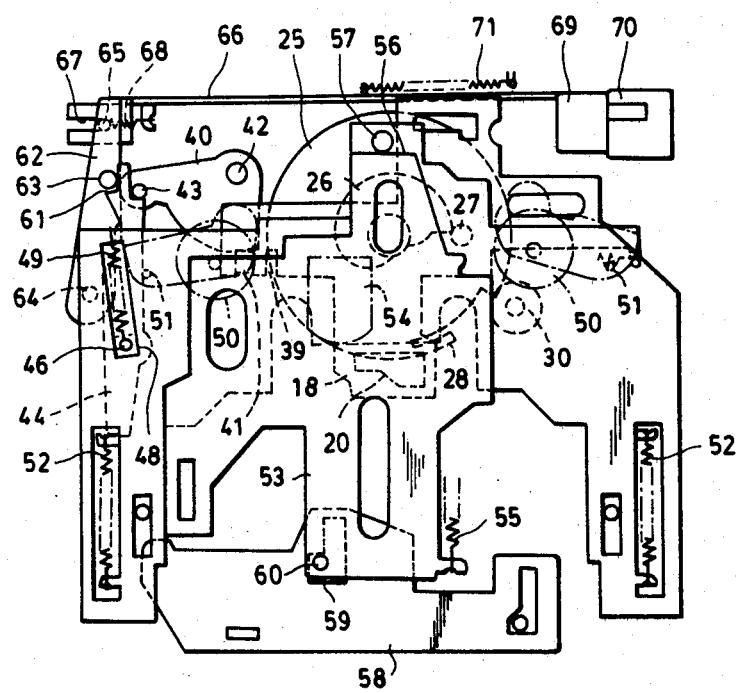

(2) When a cassette is inserted:

When the power is connected to the tape player by the insertion of a cassette, by turning on the main switch (not shown) or otherwise, the driving plunger 36 is actuated as commanded with the signal of powering, so that the plunger link 33 is pivoted to release the cam gear 25 from the stopped condition. Then, the cam gear 25 is forced by the power plate 18 to slightly rotate, as shown in FIG. 6, so that the cam 26 around the cam gear will get into mesh with the pinion 30 in the flywheel 29. And the motor thus energized will make the flywheel 29 rotate. The rotation is transmitted to the gear cam 25 which in turn will start rotating.

(3) In the course of head forwarding:

As the cam gear keeps rotating, the power plate 18 is moved to the right side in the plane of Figures by the spiral-shaped brake releasing portion 26b provided on the cam 26. Then, the power link 40, which has its claw 41 engaging with the left end of the power plate 18, is pivoted about the support shaft 42 to force the stepped portion 45 of the head link 44 engaging with the pushing pin 43 to this side of the tape player.

Simultaneously with this rotation of the cam gear 25, the holding plunger 70 is energized to lock the plunger plate 66 on the right side in the plane of Figures (on the side of the holding plunger 70) where it has been brought by the spring 71. The lock arm 62 is not pivotable unless a force exceeding the force of the spring 68 is applied between the plunger plate 66 and coupling pin 65.

In this condition, as the power link 40 is pivoted by the power plate 18, engagement is established between the pushing pin 43 of the power link 40 and the stepped portion 45 of the head link 44 so that the turning force of the power link 44 is converted to move a power to forward the head link 44. As the head link 44 is moved forwardly by the power link 40, the lock pin 63 of the lock arm 62 slides along the profile of the head link 44, and goes over the engaging projection 61 provided thereon until it engages with the upper edge of the projection. In this case, since the lock arm 62 is pivoted outwardly against the force of the spring 68, the lock pin 63 can slide over the the engaging projection 61 even if the plunger plate 66 is fixed by the holding plunger 70.

(4) Completion of head forwarding:

Along with the above-mentioned movement of the head link 44, the pinch roller plate 47 coupled with the head link 44 is also moved forward. Since the trailing edge 56 of the head plate 53 abuts the pushing shaft 57 formed at the rear end of the pinch roller plate 47, also the head plate 53 is moved forward by the pinch roller plate 47. As the result, the pinch roller 50 provided on the pinch rollers plate 47 and the head 54 on the head plate 53 attain the position of reproduction of the tape player.

Figure 9:
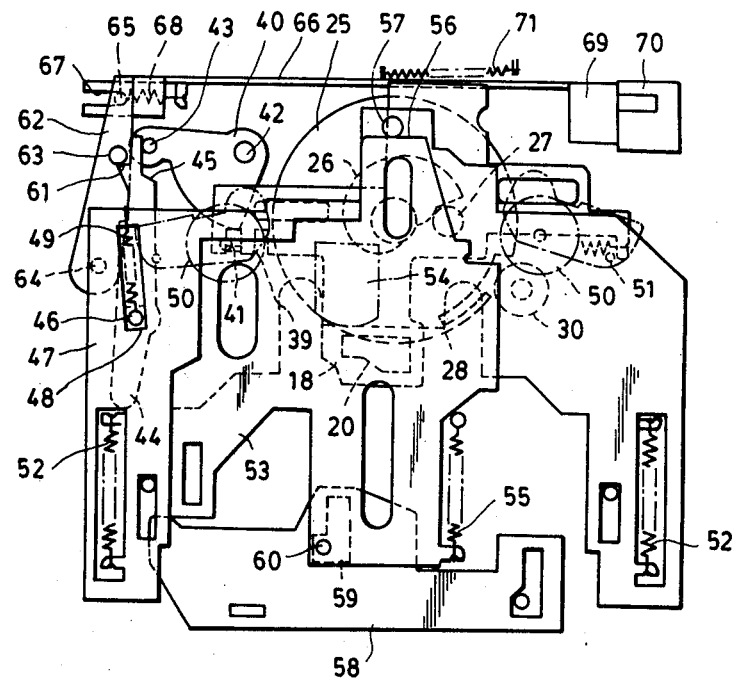
Figure 10:
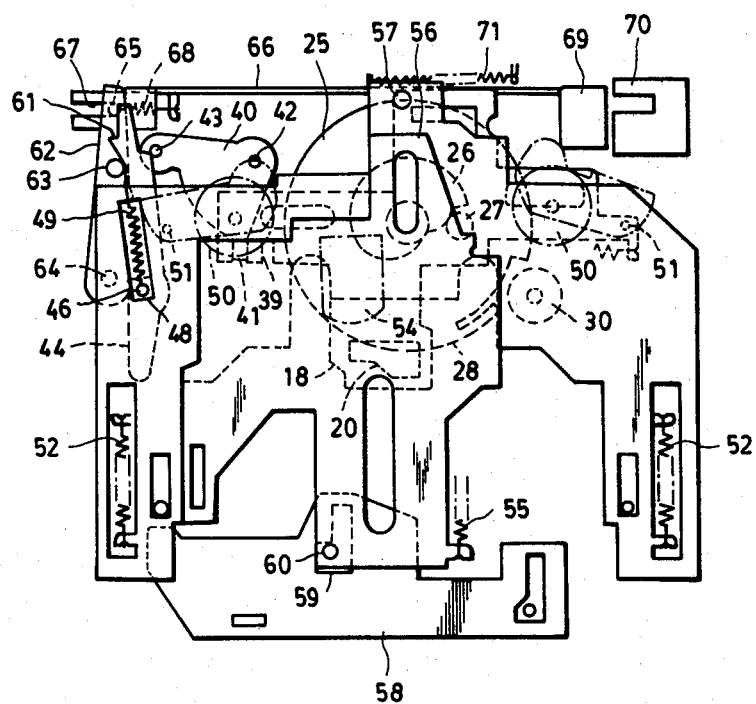

(5) State of reproduction:

After the head 55 and pinch roller 50 arrive at the position of reproduction, as the cam gear 25 further rotates, the roller 27 on the power plate 18 is moved to the inclined portion 26c of the cam 26 and along with this movement, the power plate 18 is moved to a position somewhat nearer the right side rather than the left end of its path of movement, namely, the position shown in FIG. 5 and FIG. 9. As also the cam gear 25 is rotated to that position at the same time, the engaging portion 35 of the plunger plate 33 abuts the stopper 32 provided on the cam gear so that the cam gear 25 will be stopped in the position against further rotation. Since the cut 31 formed in the gear 28 on the cam gear 25 arrives precisely at the pinion 30 on the flywheel 29, the transmission of the turning force from the flywheel 29 to the cam gear 25 is interrupted.

In the condition, the holding plunger 70 is kept energized and retains the plunger plate 66 so that the lock arm 62 is not forced to pivot and the lock pin 63 remains continuously engaged with the engaging projection 61 of the head link 44, so that the head link 44 cannot be moved back. Thus, the power plate 18 returns to the position shown in FIG. 5, and even if the pushing pin 43 of the power link 40 is disengaged from the stepped portion 45 of the head link 44, the pinch roller plate 47 and head plate 53 will be held in the position of reproduction.

(6) Fast forward or rewinding state:

When a fast forward or rewinding signal is supplied to the tape player in the condition of tape reproduction, the holding plunger 70 is deenergized as commanded with the signal. Then, the plunger plate 66 having been attracted by the holding plunger 70 and the lock arm 62 coupled with the plunger plate are freed so that the lock arm 62 is outwardly pivotable, thus the lock pin 63 is disengaged from the engaging projection 61. The head link 44 is permitted to move back. The pinch roller plate 47 coupled with the head link 44 is moved back to the initial stopped position under the action of the spring 52. At the same time, also the head plate 53 having been retained by the pushing shaft 57 of the pinch roller plate 47 is moved back under the action of the spring 55.

However, since the engaging pin 60 provided on the head plate 53 engages with the L-shaped engaging portion 59 of the head lock plate 58, the head plate 53 is permitted to move back only slightly under the prevention of the head lock plate 58, namely, to such an extent that the surface of the head will not leave the surface of the traveling tape. As the result, the head 54 is in contact with the surface of the tape traveling at a high speed in the fast forward or rewinding mode so that any soundless zone between two successive music selections recorded on the tape can be detected, thus a selected or desired music selection can be reproduced precisely from the beginning thereof.

When the beginning of a selected or desired music selections is detected and a signal for switching the tape feed mode from the fast forward or rewinding to the reproduction is supplied, the driving plunger 36 is energized as commanded with this signal. Then, the plunger plate 36 attracted by the plunger 36 is pivoted, with which the cam gear 25 released from the stopped condition starts rotating. With this rotation of the cam gear 25, the power plate 18 is moved laterally as seen in FIGS. 1(A) and 1(B) and FIGS. 4(A) and 4(B) so that the brake is applied or released while the tape is shifted to the state of reproduction, under the control of the movement of the power plate 18.

As having been described in the foregoing with reference to the embodiment, by way of example only, the braking system according to the present invention uses the cam gear 25 and power plate 18 which are to control the braking, as the means for driving the head 54 and pinch rollers 50; therefore, the head shift mechanism and braking mechanism can be constructed using parts common to both the mechanisms, which leads to the reduction in total number of the parts used in the tape player, simplification of the structure and to facility of the assembling work.

More particularly, according to the present invention, the brake actuation and release effected for a short time during which the tape feed mode is shifted from the fast foward or rewinding to the state of reproduction is controlled by the cam gear and a power plate moved following the cam gear, thus a braking system intended for use in a tape player can be realized which is of a simple construction and permits braking as precisely timed of the reel bases.

With the construction of the braking mechanism according to the present invention as shown in the Figures, the brake plate 2 is attracted by the taper cam 20 against the action of the spring and the force or power accumulated in the spring is instantaneously released by releasing the brake plate 2, thus the brake plate 2 can be quickly and strongly moved to the reel bases 1. Consequently, the reel bases 1 rotating at a high speed can be immediately stopped without any overrun of tape due to the inertia of the reel bases 1 which used to be experienced in the conventional braking system in the tape player. By adopting the braking system according to the present invention in the indexing mechanism of a tape player, it is not likely to reproduce a selected or indexed music without the beginning portion thereof. Perfect indexing is assured by the present invention.

The present invention is not limited to the embodiment having been described in the forefoing. The taper cam may be provided on the brake plate side, or the brake control pin may be provided on the power plate side. Further, for storage of the spring force for use in braking, a cam-shifted link may be engaged with the brake plate to control the latter, in place of the combination of the taper cam with the brake control pin. In place of the cam, the brake plate may be coupled to some other member of the tape player, such as the head plate on which the head is fixed, by means of a link in such a manner that the brake is controlled by the movement of the head plate.

The embodiments of the invention in which an exclusive property or privilege is claimed are defined as follows:

1. A tape player, comprising: a motor; first and second rotatably supported reel bases; selectively actuable means for operatively coupling said motor to a selected one of said reel bases for effecting rotation thereof; a braking member supported for movement in a first direction between a braking position and a retracted position and having thereon a brake shoe, said brake shoe engaging said first reel base to resist rotation thereof when said braking member is in said braking position and being spaced from said first reel base when said braking member is in said retracted position; first resilient means for yieldably urging said braking member toward said braking position; a locking member supported for movement in a second direction different from said first direction between a locking position and a release position; releasable locking means cooperable with said braking member and said locking member when said braking member is in said retracted position and said locking member is in said locking position for releasably holding said braking member in said retracted position, said locking means releasing said braking member as said locking member is moved to said release position; second resilient means for yieldably urging said locking member toward said locking position; a movably supported cam member having a cam surface thereon and means for selectively operatively coupling said motor and said cam member so that said motor effects movement of said cam member; a powering member supported for movement between first and second positions; means cooperable with said cam surface for effecting movement of said powering member between said first and second positions in response to movement of said cam member; means for effecting movement of said locking member to said release position in response to movement of said powering member from said first to said second position; and means for effecting movement of said braking member from said braking position to said retracted position in response to movement of said powering member from said second position to said first position.

2. The tape player as set forth in claim 1, wherein said means for effecting movement of said locking member includes a projection provided on said locking member and a pushing portion provided on said powering member and engageable with said projection, said projection being engaged by said pushing portion as said powering member moves from said first to said second position and effecting movement of said locking member from said locking position to said release position against the urging of said second resilient means.

3. The tape player as set forth in claim 1, wherein said means for effecting movement of said braking member includes a pin provided on said braking member and a cam surface provided on said powering member, said cam surface on said powering member slidably engaging said pin as said powering member moves from said second position to said first position and effecting movement of said braking member from said braking position to said retracted position against the urging of said first resilient means.

4. The tape player as set forth in claim 1, including means supporting a tape head for movement between third and fourth positions, and means for effecting movement of said tape head from said third position to said fourth position in response to movement of said powering member.

5. The tape player as set forth in claim 4, including two rotatably supported pinch rollers and means supporting said pinch rollers for movement between fifth and sixth positions, means for effecting movement of said pinch rollers from said fifth position to said sixth position in response to movement of said powering member from said first to said second position, means for releasably maintaining said tape head in said fourth position, and means for releasably maintaining said pinch rollers in said sixth position.

6. The tape player as set forth in claim 1, wherein said cam member is a gear supported for rotation about an axis, having teeth provided circumferentially around a peripheral edge portion thereof and having means defining an interruption in said peripheral edge portion, said cam surface thereon including a first segment which is arcuate and substantially concentric with respect to said axis, a second segment which begins at one end of said first segment and is an outward spiral, and a third segment which extends approximately radially outwardly from the other end of said first segment to the outer end of said second segment; wherein said means for selectively operatively coupling said cam member and said motor includes a rotatably supported pinion driven by said motor and drivingly engageable with said teeth on said gear, and includes said powering member being movable in a direction generally radially of said axis and having a cam follower thereon which engages said cam surface; including third resilient means cooperable with said powering member for yieldably urging said cam follower against said cam surface; wherein said means for selectively operatively coupling said cam member and said motor includes means for releasably maintaining said cam member in an angular position in which said pinion is angularly aligned with said interruption in said peripheral edge portion of said gear and is free of engagement with the teeth of said gear, and in which said cam follower is engaging said third segment of said cam surface at a location spaced from said first segment thereof so that said powering member is spaced from said second position.

7. The tape player as set forth in claim 1, wherein said braking member is located approximately between said reel bases, has a pin thereon extending substantially perpendicular to said first direction, and has a further brake shoe which respectively engages and is spaced from said second reel base when said braking member is in said braking and retracted positions; wherein said first direction is approximately perpendicular to a line extending between the axes of rotation of said reel bases and said second direction is substantially parallel to said line extending between the axes of rotation of said reel bases; wherein said releasable locking means includes a shoulder provided on said locking member and engageable with said pin on said braking member when said braking member is in said retracted position and said locking member is in said locking position, said shoulder being free of engagement with said pin when said locking member is in said release position; wherein said movement of said powering member takes place in directions substantially parallel to said second direction; wherein said means for effecting movement of said locking member includes a projection provided on said locking member and extending generally perpendicular to said second direction and includes said powering member being engageable with said projection as said powering member moves from said first to said second position to effect movement of said locking member from said locking position to said release position; wherein said means for effecting movement of said braking member includes said powering member having a further cam surface thereon which is inclined with respect to said second direction and engageable with said pin on said braking member as said powering member moves from said second position to said first position to effect movement of said braking member from said braking position to said retracted position.

* * * * *